United States Patent
Han et al.

(10) Patent No.: US 10,911,252 B2
(45) Date of Patent: Feb. 2, 2021

(54) COMMUNICATION SYSTEM FOR VEHICLE AND METHOD FOR CONTROLLING THE SAME

(71) Applicants: HYUNDAI MOTOR COMPANY, Seoul (KR); KIA MOTORS CORPORATION, Seoul (KR)

(72) Inventors: Sang Jae Han, Hwaseong-si (KR); Dong Jin Shin, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/441,620

(22) Filed: Jun. 14, 2019

(65) Prior Publication Data

US 2020/0162273 A1 May 21, 2020

(30) Foreign Application Priority Data

Nov. 15, 2018 (KR) ........................ 10-2018-0141042

(51) Int. Cl.
*H04L 12/12* (2006.01)
*H04L 29/08* (2006.01)
*H04L 12/40* (2006.01)
*B60W 50/02* (2012.01)
(Continued)

(52) U.S. Cl.
CPC .............. *H04L 12/12* (2013.01); *H04L 12/40* (2013.01); *H04L 67/34* (2013.01); *B60R 16/023* (2013.01); *B60W 50/00* (2013.01); *B60W 50/0205* (2013.01); *B60W 2050/0077* (2013.01);
(Continued)

(58) Field of Classification Search
CPC ........... H04W 4/44; H04W 4/80; H04W 4/48; H04L 67/12; H04L 12/40; H04L 41/06; H04L 12/12; H04L 2012/40215; B60W 50/0205; B60W 50/02; B60W 50/00; B60W 2050/0077; B60W 2050/0083; B60R 16/023
See application file for complete search history.

(56) References Cited

U.S. PATENT DOCUMENTS 6,531,872 B1 * 3/2003 Carr ...................... F02D 41/222
324/379
2014/0067231 A1 * 3/2014 Mosher ................... F02D 41/22
701/102
(Continued)

FOREIGN PATENT DOCUMENTS

KR 10-1724486 B1 4/2017

*Primary Examiner* — Chirag R Patel
(74) *Attorney, Agent, or Firm* — Morgan, Lewis & Bockius LLP

(57) ABSTRACT

A method for controlling a communication system of a vehicle includes selecting, by a main controller, a specific sub-controller to wake-up during an ignition-off state of the vehicle from among a plurality of sub-controllers. The main controller transmits a message including information about a time when the wake-up is scheduled and a specific task to be performed after the wake-up to the selected specific sub-controller if the ignition-off state of the vehicle is maintained. The selected sub-controller is caused to wake up at the wake-up time transmitted from the main controller and to perform the specific task during the ignition-off state of the vehicle. A corresponding communication system of the vehicle is also provided.

14 Claims, 6 Drawing Sheets

(51) Int. Cl.
*B60R 16/023* (2006.01)
*B60W 50/00* (2006.01)
(52) U.S. Cl.
CPC ............... *B60W 2050/0083* (2013.01); *H04L 2012/40215* (2013.01); *H04L 2012/40273* (2013.01)

(56) References Cited

U.S. PATENT DOCUMENTS

2015/0332526 A1* 11/2015 Kurnik .................. G07C 5/085
 701/31.7
2019/0108010 A1* 4/2019 Tillman ............... G07C 5/0841

* cited by examiner

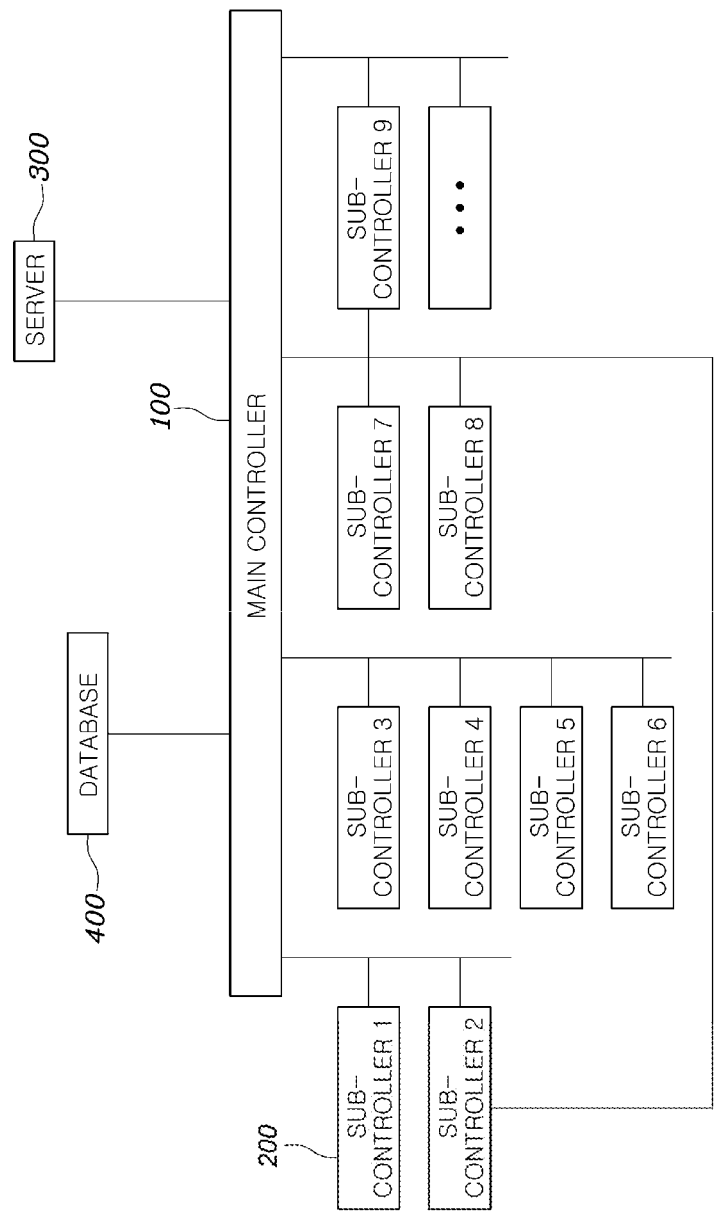
[FIG. 1]

[FIG. 2]
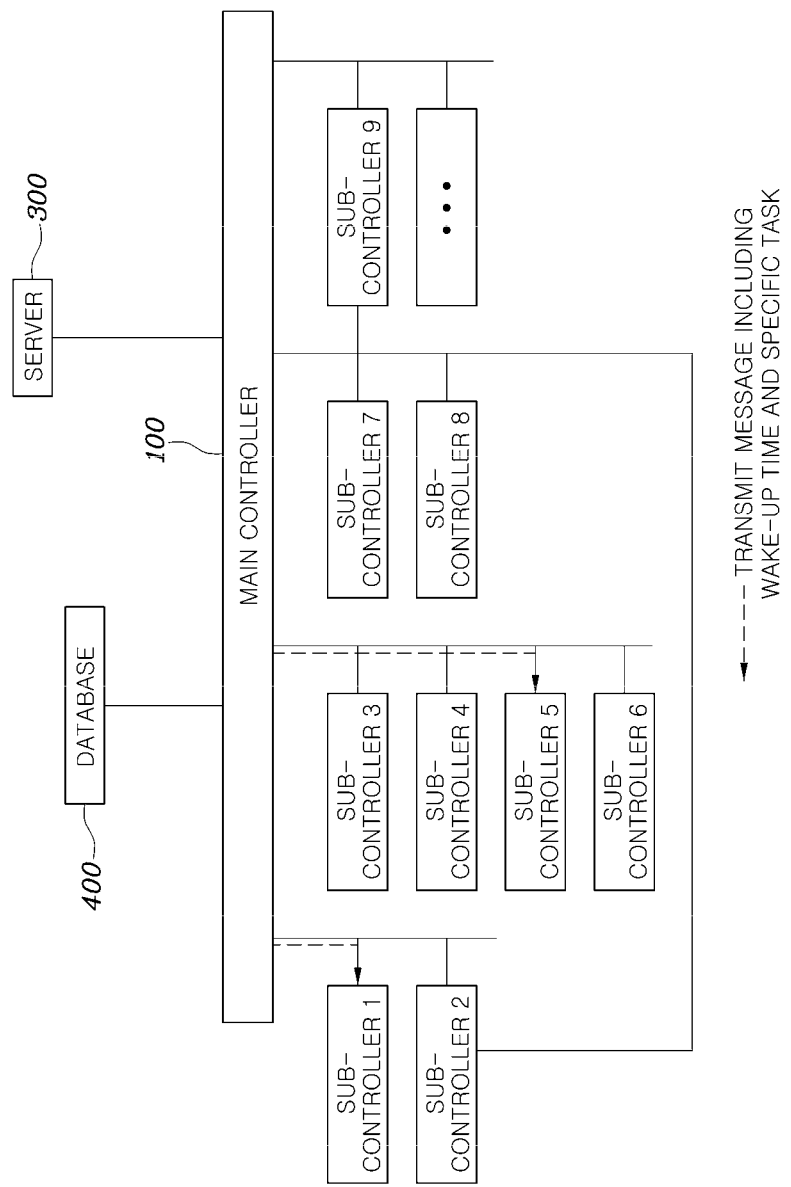

[FIG. 3]
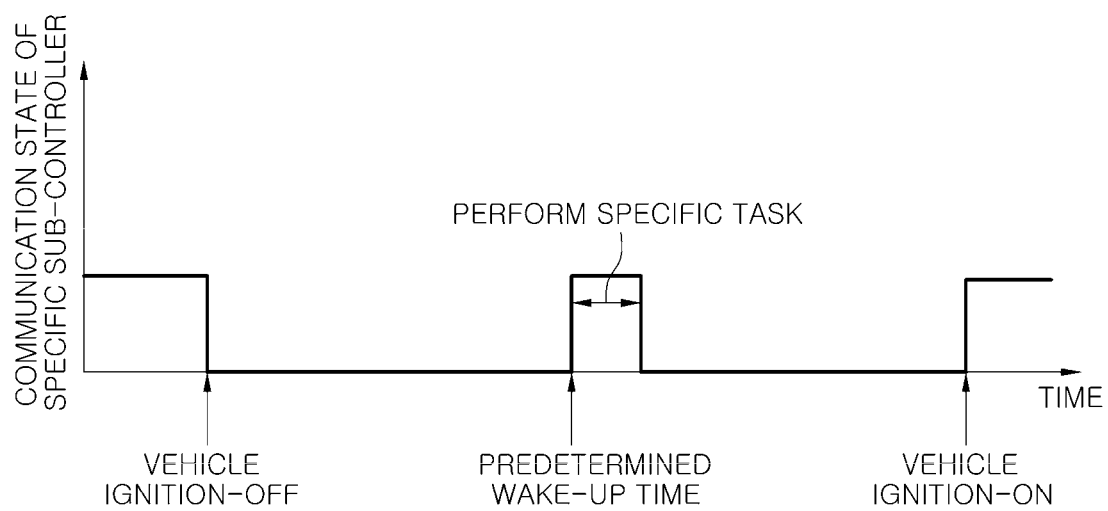

[FIG. 4]
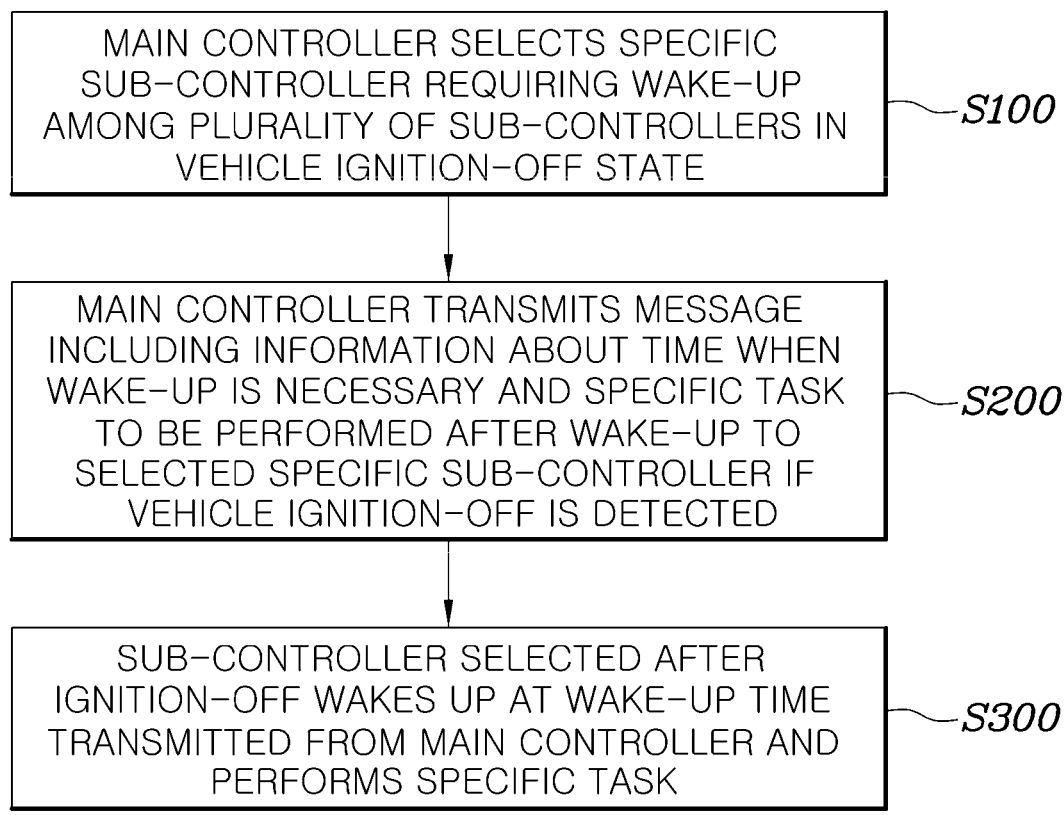

[FIG. 5]
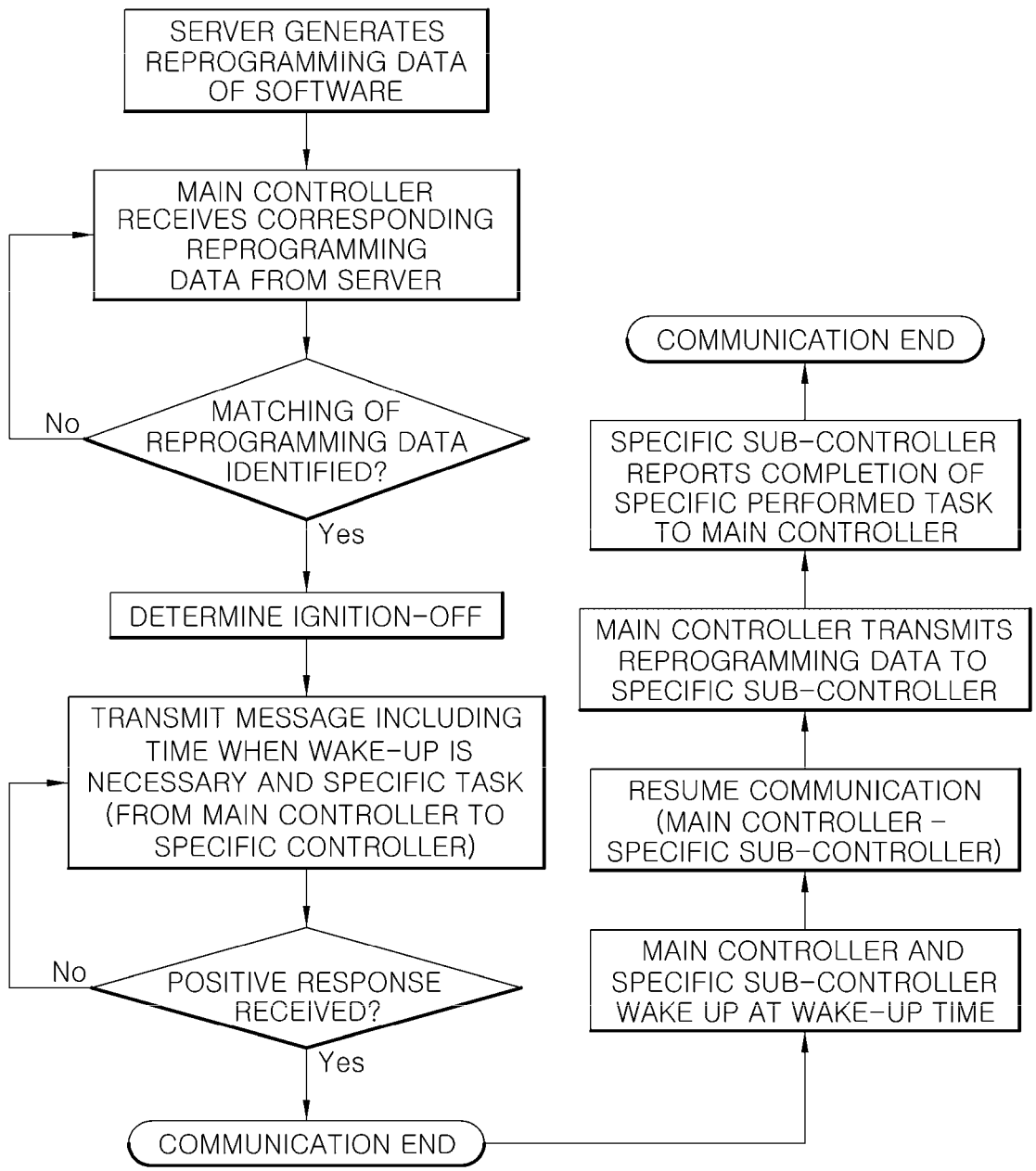

[FIG. 6]
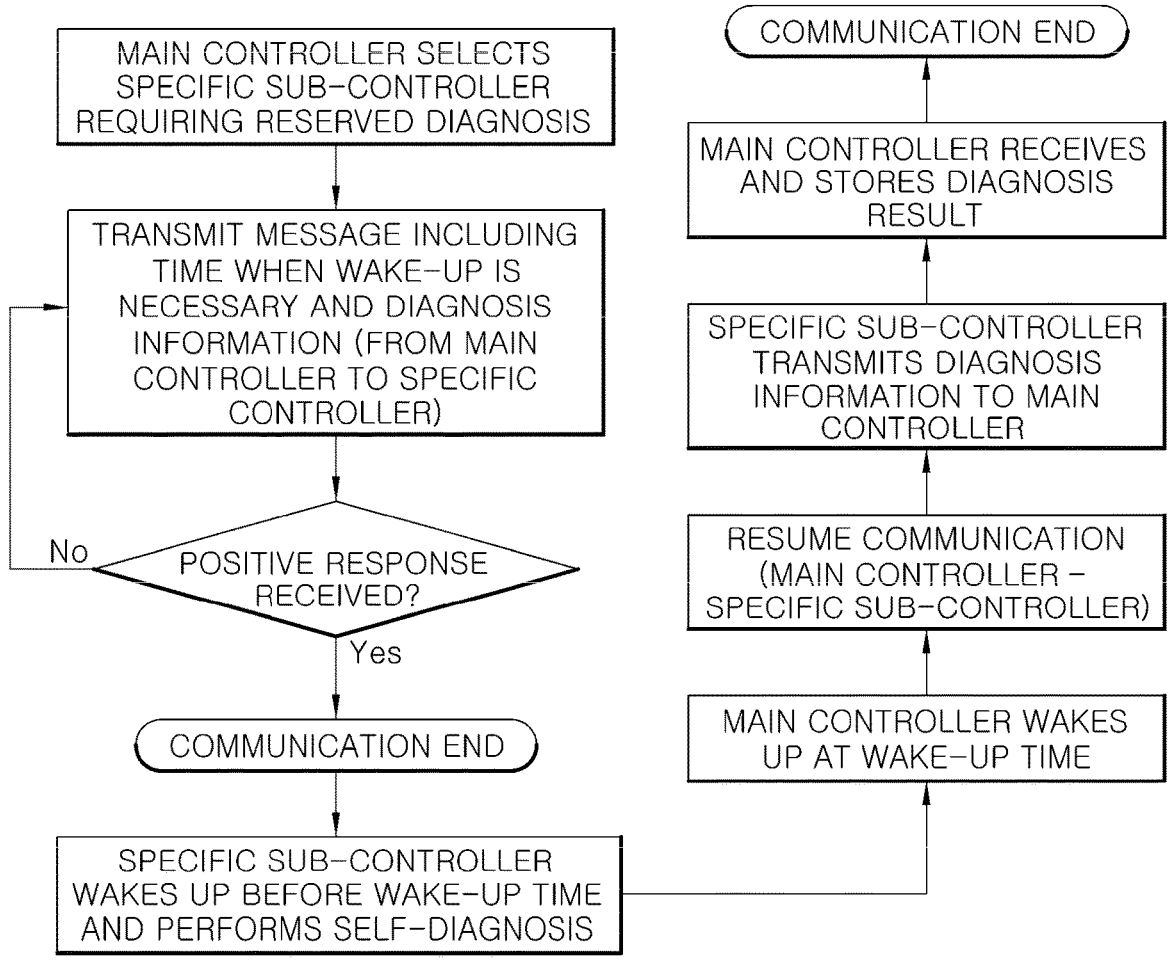

COMMUNICATION SYSTEM FOR VEHICLE AND METHOD FOR CONTROLLING THE SAME

CROSS REFERENCE TO RELATED APPLICATION

The present application claims priority of Korean Patent Application No. 10-2018-0141042 filed on Nov. 15, 2018, the entire contents of which is incorporated herein for all purposes by this reference.

BACKGROUND OF THE INVENTION

Field of the Invention

The present disclosure relates to a communication system for a vehicle and a method for controlling the same, and more particularly, to a communication system for a vehicle and a method for controlling the same, which can control communication between controllers in the vehicle during ignition-off of the vehicle.

Description of the Related Art

Recently, various kinds of electronic systems are mounted on a vehicle, and various electronic control devices for electronic control of the corresponding vehicle are mounted on the vehicle. Such various electronic control devices are connected to one another through a communication system of the vehicle to transmit and receive information with one another, and thus various functions of the vehicle can be performed.

In general, a vehicle applies a method for blocking a power supply to the electronic control device or entering into a sleep mode in order to reduce dark current consumption after ignition-off (IGN OFF), and even the communication system of the vehicle defines sleep, alive, and off states to be reflected in designs in a similar manner.

Currently, in case where communication is necessary between the electronic control devices until CAN OFF after the ignition-off of the vehicle, the controller area network (CAN) partially implements bus on/off using network management (NM) packets.

However, in order to make a specific electronic control device wake up using a network management function, it is necessary to make a plurality of electronic control devices connected to a bus connected to the specific electronic control device also wake up, and this may cause unnecessary operations of the electronic control devices, resulting in the increase of the dark current consumption.

Accordingly, there is a need for technical development capable of performing a necessary task after resuming communication by making only a specific controller requiring the communication wake up at a specific time after the ignition-off of the vehicle without using the network management.

SUMMARY OF THE INVENTION

The present disclosure is proposed to solve the above-mentioned problems, and an object of the present disclosure is to provide a communication system for a vehicle and a method for controlling the same, which can make a specific controller requiring communication wake up during a vehicle ignition-off state without using network management and perform a specific task after the communication is resumed.

In order to achieve the above object, a method for controlling a communication system of a vehicle may include selecting, by a main controller, a specific sub-controller to wake-up in an ignition-off state of the vehicle among a plurality of sub-controllers. The main controller transmits a message including information about a time when the wake-up is scheduled and a specific task to be performed after the wake-up to the selected specific sub-controller if the ignition-off state of the vehicle is detected. The selected specific sub-controller is caused to wake up at the wake-up time transmitted from the main controller and to perform the specific task during the ignition-off state of the vehicle.

The method may further include transmitting, by the selected specific sub-controller, acknowledgment of receipt of the message to the main controller after the transmitting, by the main controller, of the message including the information about the time when the wake-up is scheduled and the specific task to be performed after the wake-up to the selected specific sub-controller; and ending communication between the main controller and selected specific the sub-controller.

The specific task to be performed after the wake-up may include at least one of reprogramming of software preinstalled in the selected specific sub-controller and performing a diagnosis of the selected specific sub-controller.

The method may further include generating, by a server, reprogramming data of the software before the selecting, by the main controller, the specific sub-controller to wake-up in the ignition-off state of the vehicle if the specific task includes the reprogramming of the software; receiving, by the main controller, the reprogramming data of the software from the server; and identifying, by the main controller, matching of the received reprogramming data.

The method may further include causing the main controller and the selected specific sub-controller to wake up at a predetermined wake-up time after ending of communication between the selected specific sub-controller and the main controller, and transmitting, by the main controller, the reprogramming data of the software received from the server to the selected specific sub-controller; performing, by the selected specific sub-controller, reprogramming of the software preinstalled in the selected specific sub-controller based on the received reprogramming data of the software, and transmitting a reprogramming completion message to the main controller; and ending communication between the main controller and the selected specific sub-controller of the vehicle.

The method may further include causing the sub-controller to wake up before a predetermined wake-up time after ending of communication between the selected specific sub-controller and the main controller if the specific task includes the performing the diagnosis of the selected specific sub-controller, and performing, by the selected specific sub-controller, self-diagnosis; causing the main controller to wake up at the predetermined wake-up time, and transmitting, by the selected specific sub-controller, the result of the self-diagnosis to the main controller; storing, by the main controller, the result of the diagnosis received from the selected specific sub-controller in a database; and ending communication between the main controller and the selected specific sub-controller of the vehicle.

In order to achieve the above object, a communication system of a vehicle may include a plurality of sub-controllers; and a main controller communicatively connected to the sub-controllers and configured to detect ignition-off of the vehicle, to select a specific sub-controller to wake-up in an ignition-off state of the vehicle, and to transmit a message including information about a time when the wake-up is scheduled and a specific task to be performed after the wake-up to the selected specific sub-controller.

The specific task to be performed after the wake-up may include at least one of reprogramming of software preinstalled in the selected specific sub-controller and performing a diagnosis of the selected specific sub-controller.

The communication system may further include a server configured to generate reprogramming data of the software preinstalled in the selected specific sub-controller and to transmit the generated reprogramming data to the main controller.

The communication system may further include a database configured to store matching determination information for identifying matching of the reprogramming data received from the server and a result of performing the diagnosis of the selected specific sub-controller.

The selected specific sub-controller may transmit, to the main controller, acknowledgment of receipt of the message including the information about the time when the wake-up is scheduled and the specific task to be performed after the wake-up, and if the main controller receives the acknowledgment of receipt of the message from the selected specific sub-controller, may end communication between the main controller and the selected specific sub-controller.

If the specific task includes the reprogramming of the software, the main controller may receive the reprogramming data of the software from the server before the main controller selects the specific sub-controller to wake-up in the ignition-off state of the vehicle.

The main controller may identify the matching of the reprogramming data received from the server based on the matching determination information stored in the database.

If the specific task includes the reprogramming of the software, the main controller and the selected specific sub-controller may wake up at a predetermined wake-up time after ending of communication between the main controller and the selected specific sub-controller, and the main controller may transmit the reprogramming data of the software received from the server to the selected specific sub-controller.

The selected specific sub-controller may perform reprogramming of the software preinstalled in the selected specific sub-controller based on the received reprogramming data of the software, and may transmit a reprogramming completion message to the main controller.

If the specific task includes the pertaining the diagnosis of the selected specific sub-controller, the selected specific sub-controller may wake up before a predetermined wake-up time after ending of communication between the main controller and the selected specific sub-controller, and may perform self-diagnosis.

The main controller may wake up at the predetermined wake-up time, and if the result of the self-diagnosis is received from the selected specific sub-controller, the main controller may store the result of the self-diagnosis in the database.

According to the present disclosure, since a specific sub-controller requiring communication wakes up in a vehicle ignition-off state without using network management and performs a specific task after the communication is resumed, unnecessary controllers are prevented from waking up, and thus dark current can be minimized.

In addition, driving-related controllers, which are unable to be diagnosed during driving due to safety accidents and the like, can be safely diagnosed through reserved diagnosis in a vehicle-off state.

BRIEF DESCRIPTION OF THE DRAWINGS

The above and other objects, features and advantages of the present disclosure will be more clearly understood from the following detailed description taken in conjunction with the accompanying drawings, in which:

FIG. 1 is a diagram illustrating a communication system of a vehicle according to an embodiment of the present disclosure;

FIG. 2 is a diagram explaining transfer of a message including a wake-up time and a specific performed task to a specific sub-controller during vehicle ignition-off in a communication system of a vehicle according to an embodiment of the present disclosure;

FIG. 3 is a diagram explaining a communication state where a specific sub-controller wakes up at a time when wake-up is necessary in a communication system of a vehicle according to an embodiment of the present disclosure;

FIG. 4 is a diagram illustrating a flow of a method for controlling a communication system of a vehicle according to an embodiment of the present disclosure;

FIG. 5 is a flowchart illustrating a flow of reprogramming of software of a specific sub-controller in a method for controlling a communication system of a vehicle according to an embodiment of the present disclosure; and FIG. 6 is a flowchart illustrating a flow of reserved diagnosis of a specific sub-controller in a method for controlling a communication system of a vehicle according to an embodiment of the present disclosure.

DESCRIPTION OF PREFERRED EMBODIMENTS

Hereinafter, a communication system of a vehicle and a method for controlling the same according to preferred embodiments of the present disclosure will be described with reference to the accompanying drawings.

FIG. 1 is a diagram illustrating a communication system of a vehicle according to an embodiment of the present disclosure, and FIG. 2 is a diagram explaining transfer of a message including a wake-up time and a specific performed task to a specific sub-controller during vehicle ignition-off in a communication system of a vehicle according to an embodiment of the present disclosure. FIG. 3 is a diagram explaining a communication state where a specific sub-controller wakes up at a time when wake-up is necessary in a communication system of a vehicle according to an embodiment of the present disclosure.

As illustrated in FIG. 1, a communication system of a vehicle according to an embodiment of the present disclosure may include a plurality of sub-controllers 200, and a main controller 100 connected to the sub-controllers 200 through controller area network (CAN) communication. The communication system may further include a server 300 configured to generate reprogramming data of software preinstalled in the sub-controller(s) 200 and to transmit the generated reprogramming data to the main controller 100. In addition, the communication system may further include a database 400 configured to store matching determination information for identifying matching of the reprogramming data received from the server 300 and the result of diagnosis of the sub-controller.

Specifically, the plurality of sub-controllers 200 mean controllers for controlling various electronic control devices mounted in the vehicle. For example, the sub-controllers 200 may include devices for controlling related performances, such as electronic control of a fuel supply system, exhaust gas recirculation (EGR) reflux rate, ignition time, and idling revolutions per minute (RPM), using a microcomputer. In addition, as possibly occurring trouble monitoring functions, the sub-controllers 200 may include self-diagnosis systems, such as systems for fuel injection control, ignition time control, idle speed control, EGR control, fuel pump control, exhaust temperature warning control, and self-diagnosis function. More specifically, the sub-controllers 200 may include an engine management system (EMB), electric stability control (ESC), integrated body unit (IBU), motor driven power steering (MDPS), dual automatic temperature control (DATC), and full automatic temperature control (FATC).

As illustrated in FIG. 1, the main controller 100 may be connected to the plurality of sub-controllers 200. In this case, according to an embodiment, automotive wire data communication, such as controller area network (CAN), may be used for connection between the main controller 100 and the plurality of sub-controllers 200, but the connection scheme is not limited thereto.

Further, the main controller 100 may detect ignition-off of the vehicle, select a specific sub-controller requiring wake-up among the plurality of sub-controllers in an ignition-off state of the vehicle, and transmit a message including information about a time when the wake-up is necessary and information about a specific task to be performed after the wake-up to the selected specific sub-controller as illustrated in FIG. 2. In this case, among the plurality of sub-controllers 200, the specific sub-controller, which wakes up in a vehicle-off state through the main controller 100 and is selected as a controller to perform a specific task, can wake up at a wake-up time transmitted from the main controller 100 and can perform the specific task to be performed.

Here, the specific task to be performed by the selected specific sub-controller 200 after the wake-up may include reprogramming of software preinstalled in the selected specific controller 200 and reserved diagnosis of the selected specific controller. In other words, according to an embodiment, the specific sub-controller 200 selected by the main controller 100 may perform the reprogramming of the preinstalled software after a predetermined time as illustrated in FIG. 3 in the ignition-off state of the vehicle, that is, after the wake-up at the time when the wake-up is scheduled or necessary, or according to another embodiment, the specific sub-controller 200 may pertain self-diagnosis after the wake-up at the time when the wake-up is scheduled or necessary in the ignition-off state of the vehicle.

On the other hand, the main controller 100 may select the specific sub-controller to wake-up (e.g., a specific sub-controller requiring the wake-up) among the plurality of sub-controllers in the ignition-off state of the vehicle, and in an embodiment, if the specific task is the reserved diagnosis, the main controller 100 may select the specific sub-controller 200 in accordance with a user's input. That is, a user may select the specific sub-controller 200 requiring the reserved diagnosis in the ignition-off state of the vehicle, and the main controller 100 may select the specific sub-controller 200 selected by the user as the specific sub-controller 200 to wake-up in the ignition-off state of the vehicle. In addition, the main controller 100 may compare the latest software from the server 300 to be described later with the software preinstalled in the sub-controller 200, and if the software preinstalled in the sub-controller 200 is not the latest software, the main controller 100 may determine that the reprogramming of the software of the corresponding sub-controller 200 is needed and thus the wake-up of the corresponding sub-controller 200 is needed in the ignition-off state of the vehicle.

The server 300 may generate reprogramming data of the software preinstalled in the specific sub-controller 200 selected by the main controller 100, and may transmit the generated reprogramming data to the main controller 100 in an over-the-air manner. Here, the reprogramming data transmitted from the server 300 to the main controller 100 may be an over-the-air (OTA) update package including binary data related to the reprogramming of the software preinstalled in the specific sub-controller 200, an electronic certificate including public key information, and an electronic signature signed by the subject that provides the corresponding binary data.

The database 400 serves to store matching determination information for identifying the matching of the reprogramming data received from the server 300 and the result of diagnosis of the sub-controller 200. Here, in an embodiment, the matching determination information for identifying the matching of the reprogramming data received from the server 300 may be the public key information of the electronic certificate included in the reprogramming data. In addition, the main controller 100 may identify the matching of the reprogramming data received from the server 300 based on the matching determination information stored in the database 400, and by comparing the public key information stored in the database 400 with the public key included in the electronic certificate of the reprogramming data, the main controller 100 can identify the matching of the reprogramming data received from the server 300. However, the above-described matching determination scheme is merely exemplary, and the matching of the reprogramming data received from the server 300 can be identified through various schemes.

Hereinafter, a method for controlling the communication system of the vehicle as described above will be described in detail with reference to FIGS. 4 to 6.

FIG. 4 is a diagram illustrating a flow of a method for controlling a communication system of a vehicle according to an embodiment of the present disclosure. FIG. 5 is a flowchart illustrating a flow of reprogramming of software of a specific sub-controller in a method for controlling a communication system of a vehicle according to an embodiment of the present disclosure, and FIG. 6 is a flowchart illustrating a flow of reserved diagnosis of a specific sub-controller in a method for controlling a communication system of a vehicle according to an embodiment of the present disclosure.

As described above, the present disclosure relates to a method for controlling communication during ignition-off of a vehicle between a plurality of sub-controllers and a main controller connected to the sub-controllers through CAN communication. As illustrated in FIG. 4, a method for controlling a communication system of a vehicle according to an embodiment of the present disclosure may include selecting, by a main controller, a specific sub-controller to wake-up in an ignition-off state of the vehicle among a plurality of sub-controllers; transmitting, by the main controller, a message including information about a time when the wake-up is scheduled and a specific task to be performed after the wake-up to the selected specific sub-controller if the ignition-off of the vehicle is detected; and making the selected sub-controller wake up at the wake-up time transmitted from the main controller and perform the specific task after the ignition-off.

In addition, as illustrated in FIGS. 5 and 6, the method may further include transmitting to the main controller, by the sub-controller, an acknowledgment of receipt of the message after the transmitting, by the main controller, the message including the information about the time when the wake-up is necessary and the specific task to be performed after the wake-up to the selected specific sub-controller; and ending communication between the main controller and the sub-controller. Here, ending of the communication between the main controller and the sub-controller may mean turning-off of the CAN communication between the main controller and the sub-controller.

In addition, in an embodiment, if the message including the information about the time when the wake-up is scheduled and the specific task is not successfully transmitted from the main controller to the selected specific sub-controller, the sub-controller may request the main controller to retransmit the corresponding message.

On the other hand, the specific task to be performed after the wake-up may include reprogramming of software preinstalled in the selected specific controller and reserved diagnosis of the selected specific controller. In other words, according to an embodiment, the specific sub-controller selected by the main controller may perform the reprogramming of the preinstalled software after a predetermined time as illustrated in FIG. 3 during the ignition-off state of the vehicle, that is, after the wake-up at the time when the wake-up is necessary and before the vehicle ignition-on time, or according to another embodiment, the specific sub-controller may perform self-diagnosis after the wake-up at the time when the wake-up is necessary in the ignition-off state of the vehicle.

Referring to FIGS. 4 and 5, the method for controlling the communication system of the vehicle may further include generating, by a server, reprogramming data of the software before the selecting, by the main controller, the specific sub-controller to wake-up in the ignition-off state of the vehicle if the specific task is the reprogramming of the software; receiving, by the main controller, the reprogramming data of the software from the server; and identifying, by the main controller, matching of the received reprogramming data.

Further, if the matching of the received reprogramming data is identified, the main controller may transmit the message including the information about the time when the wake-up is scheduled and the specific task to be performed after the wake-up to the selected specific sub-controller when the ignition-off of the vehicle is maintained, and after the sub-controller transmits whether to receive the corresponding message to the main controller, the communication between the main controller and the sub-controller may be ended.

In addition, the method may further include making the main controller and the sub-controller wake up at a predetermined wake-up time after the ending the communication between the sub-controller and the main controller, and transmitting, by the main controller, the reprogramming data of the software received from the server to the selected specific sub-controller; performing, by the sub-controller, the reprogramming of the preinstalled software based on the received reprogramming data of the software, and transmitting a reprogramming completion message of the software to the main controller; and ending the communication of the vehicle. Here, ending of the communication of the vehicle means ending of the communication between the main controller and the plurality of sub-controllers.

Referring to FIGS. 4 and 6, the method for controlling the communication system of the vehicle will be described. If the specific task is the reserved diagnosis of the specific controller, the main controller may select the specific sub-controller requiring the reserved diagnosis, and may transmit the message including the time when the wake-up is necessary and the diagnosis information to the sub-controller. The sub-controller may transmit whether to receive the corresponding message to the main controller, and then the communication between the main controller and the sub-controller may be ended.

In addition, the method may further include making the sub-controller wake up before a predetermined wake-up time after the ending the communication between the sub-controller and the main controller, and performing, by the sub-controller, self-diagnosis; making the main controller wake up at the predetermined wake-up time to resume the communication between the main controller and the sub-controller, and transmitting, by the sub-controller, the result of the self-diagnosis to the main controller; storing, by the main controller, the result of the diagnosis received from the sub-controller in a database; and ending the communication of the vehicle. In this case, the reason why the sub-controller wakes up before the predetermined wake-up time is that the sub-controller should transmit the result of the reserved diagnosis to the main controller at the predetermined wake-up time. In other words, in consideration of an expected time taken for performing the reserved diagnosis and the predetermined wake-up time, the sub-controller may wake up before the corresponding wake-up time as long as the expected diagnosis time to perform the reserved diagnosis, and may transmit the result of the diagnosis to the main controller at the predetermined wake-up time.

The main controller 100, the sub-controller(s) 200, the server 300, and the database 400 each may include one or more of a processor, a memory storing program instructions, a wired or wireless communication interface (e.g., an interface for communicating across the CAN), and the like, which are communicatively connected to each other through direct links, a communication BUS, or the like. Each may further be connected to other elements or devices, such as a large data storage medium (e.g., in the case of database 400), a wide area communication network (e.g., in the case of server 300), and/or various components of the vehicle (e.g., in the case of main controller 100 and sub-controllers 200). In operation, the processor of each of the main controller 100, sub-controller(s) 200, server 300, and database 400 executes the program instructions stored in the memory to thereby perform the various functions described herein as being performed by the main controller 100, sub-controller(s) 200, server 300, and database 400 including functions to transmit, receive, or process data or information. The main controller 100 and sub-controller(s) 200 may further each include a clock operative to control timing of operations by the processor including timing of wake-up.

Additionally, the sub-controller(s) 200 and, optionally, one or more of the main controller 100, server 300, and database 400, are configured to operate in two different states of operation: a low-power state of operation in which power consumption is relatively low and the sub-controller 200 (or other element) can only perform limited functions, and a normal state of operation in which power consumption is relatively higher and the sub-controller 200 (or other element) can only perform most or all functions attributed thereto. The sub-controller(s) 200 transition from the low-power state of operation to the normal state of operation during a wake-up event, and transition back to the low-power state of operation following completion of specific functions performed following wake-up. The sub-controller(s) 200 further generally transition from the low-power state of operation to the normal state of operation in response to detecting a vehicle ignition-on event, and transition to the low-power state in response to detecting a vehicle ignition-off event.

Although the preferred embodiments of the present disclosure have been illustrated and described for illustrative purposes, those of ordinary skill in the art will appreciate that various modifications, additions and substitutions are possible, without departing from the scope and spirit of the invention as disclosed in the accompanying claims.

What is claimed is:

1. A method for controlling a communication system of a vehicle, comprising:
    selecting, by a main controller, a specific sub-controller to wake-up in an ignition-off state of the vehicle among a plurality of sub-controllers;
    transmitting, by the main controller, a message including information about a time when the wake-up is scheduled and a specific task to be performed after the wake-up to the selected specific sub-controller if the ignition-off state of the vehicle is maintained;
    causing the selected specific sub-controller to wake up before a predetermined wake-up time after ending of communication between the selected specific sub-controller and the main controller if the specific task comprises the performing the diagnosis of the selected specific sub-controller, and performing, by the selected specific sub-controller, self-diagnosis;
    causing the main controller to wake up at the predetermined wake-up time, and transmitting, by the selected specific sub-controller, the result of the self-diagnosis to the main controller;
    storing, by the main controller, the result of the diagnosis received from the selected specific sub-controller in a database; and
    ending communication between the main controller and the selected specific sub-controller of the vehicle.

2. The method according to claim 1, further comprising:
    transmitting, by the selected specific sub-controller, acknowledgment of receipt of the message to the main controller after the transmitting, by the main controller, of the message including the information about the time when the wake-up is scheduled and the specific task to be performed after the wake-up to the selected specific sub-controller; and
    ending communication between the main controller and the selected specific sub-controller.

3. The method according to claim 1, wherein the specific task to be performed after the wake-up comprises at least one of reprogramming of software preinstalled in the selected specific sub-controller and performing a diagnosis of the selected specific sub-controller.

4. The method according to claim 3, further comprising:
    generating, by a server, reprogramming data of the software before the selecting, by the main controller, the specific sub-controller to wake-up in the ignition-off state of the vehicle if the specific task comprises the reprogramming of the software;
    receiving, by the main controller, the reprogramming data of the software from the server; and
    identifying, by the main controller, matching of the received reprogramming data.

5. The method according to claim 4, further comprising:
    causing the main controller and the selected specific sub-controller to wake up at a predetermined wake-up time after ending of communication between the selected specific sub-controller and the main controller, and transmitting, by the main controller, the reprogramming data of the software received from the server to the selected specific sub-controller;
    performing, by the selected specific sub-controller, reprogramming of the software preinstalled in the selected specific sub-controller based on the received reprogramming data of the software, and transmitting a reprogramming completion message to the main controller; and
    ending communication between the main controller and the selected specific sub-controller of the vehicle.

6. A communication system of a vehicle comprising:
    a plurality of sub-controllers; and
    a main controller communicatively connected to the sub-controllers and configured to detect ignition-off of the vehicle, to select a specific sub-controller to wake-up in an ignition-off state of the vehicle, and to transmit a message including information about a time when the wake-up is scheduled and a specific task to be performed after the wake-up to the selected specific sub-controller; and
    a database configured to store a result of performing the diagnosis of the selected specific sub-controller,
    wherein if the specific task comprises the performing the diagnosis of the selected specific sub-controller, the selected specific sub-controller wakes up before a predetermined wake-up time after ending of communication between the main controller and the selected specific sub-controller, and performs self-diagnosis, and
    wherein the main controller wakes up at the predetermined wake-up time, and if the result of the self-diagnosis is received from the selected specific sub-controller, the main controller stores the result of the self-diagnosis in the database.

7. The communication system according to claim 6, wherein the specific task to be performed after the wake-up comprises at least one of reprogramming of software preinstalled in the selected specific sub-controller and performing a diagnosis of the selected specific sub-controller.

8. The communication system according to claim 7, further comprising:
    a server configured to generate reprogramming data of the software preinstalled in the selected specific sub-controller and to transmit the generated reprogramming data to the main controller.

9. The communication system according to claim 8,
    wherein the database stores matching determination information for identifying matching of the reprogramming data received from the server.

10. The communication system according to claim 9, wherein the selected specific sub-controller transmits, to the main controller, acknowledgement of receipt of the message including the information about the time when the wake-up is scheduled and the specific task to be performed after the wake-up, and if the main controller receives the acknowledgement of receipt of the message from the selected specific sub-controller, ends communication between the main controller and the selected specific sub-controller.

11. The communication system according to claim 10, wherein if the specific task comprises the reprogramming of the software, the main controller receives the reprogramming data of the software from the server before the main controller selects the specific sub-controller to wake-up in the ignition-off state of the vehicle.

12. The communication system according to claim 11, wherein the main controller identifies the matching of the reprogramming data received from the server based on the matching determination information stored in the database.

13. The communication system according to claim 12, wherein if the specific task comprises the reprogramming of the software, the main controller and the selected specific sub-controller wake up at a predetermined wake-up time after ending of communication between the main controller and the selected specific sub-controller, and the main controller transmits the reprogramming data of the software received from the server to the selected specific sub-controller.

14. The communication system according to claim 13, wherein the selected specific sub-controller performs reprogramming of the software preinstalled in the selected specific sub-controller based on the received reprogramming data of the software, and transmits a reprogramming completion message to the main controller.

* * * * *